Sheet-1
2 Sheets

D. S. McNamara.

Mower.

No 76
No 1181

Reissued May. 7, 1861

Witnesses

Wm York Arlo
A. C. Widdicomb

Inventor

D. S. McNamara
By his Attorney
Thos. H. Dodge

Sheet-2
2 Sheets

D. S. McNamara.

Mower.

No. 76
No. 1181

Reissued May. 7, 1861

Witnesses

Wm. York Allen
A. C. Widdicomb

Inventor

D. S. McNamara

By his Attorney

Thos. H. Dodge

UNITED STATES PATENT OFFICE.

D. S. McNAMARA, OF TROY, NEW YORK, ASSIGNOR TO G. M. SELDEN.

IMPROVEMENT IN HARVESTERS.

Specification forming part of Letters Patent No. 21,612, dated September 28, 1858; Reissue No. 1,181, dated May 7, 1861.

*To all whom it may concern:*

Be it known that I, DAVID S. McNAMARA, formerly of North Hoosic, New York, but now of Troy, in the county of Rensselaer and State of New York, have invented certain new and useful Improvements in Grain and Grass Harvesters; and I do hereby declare that the following is a full, clear, and exact description of the same, reference being had to the accompanying drawings, forming a part of this specification, and in which—

Figure 1:
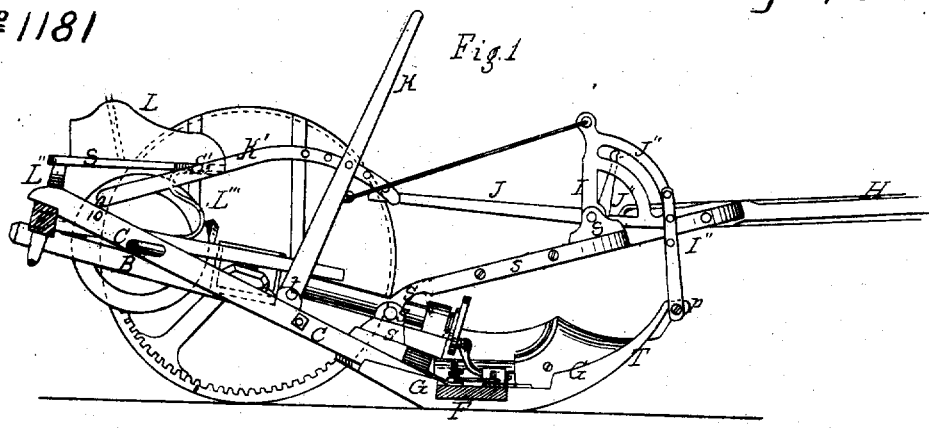
Figure 4:
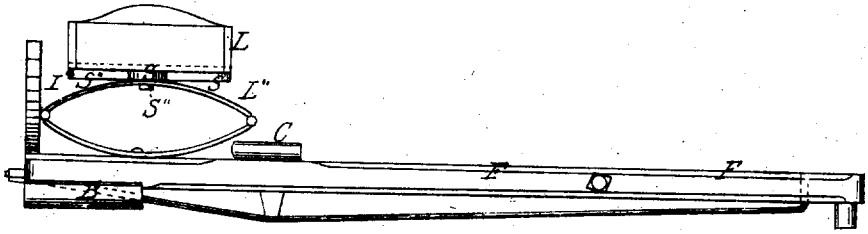
Figure 3:
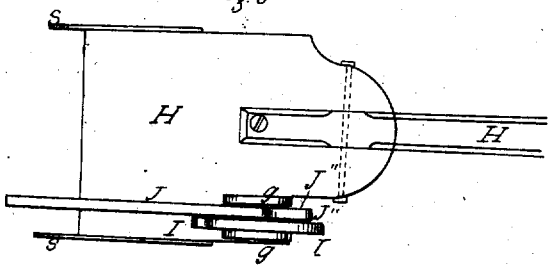
Figure 6:
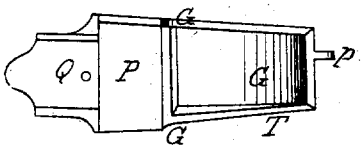
Figure 7:
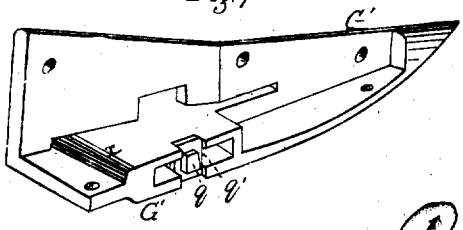
Figure 2:
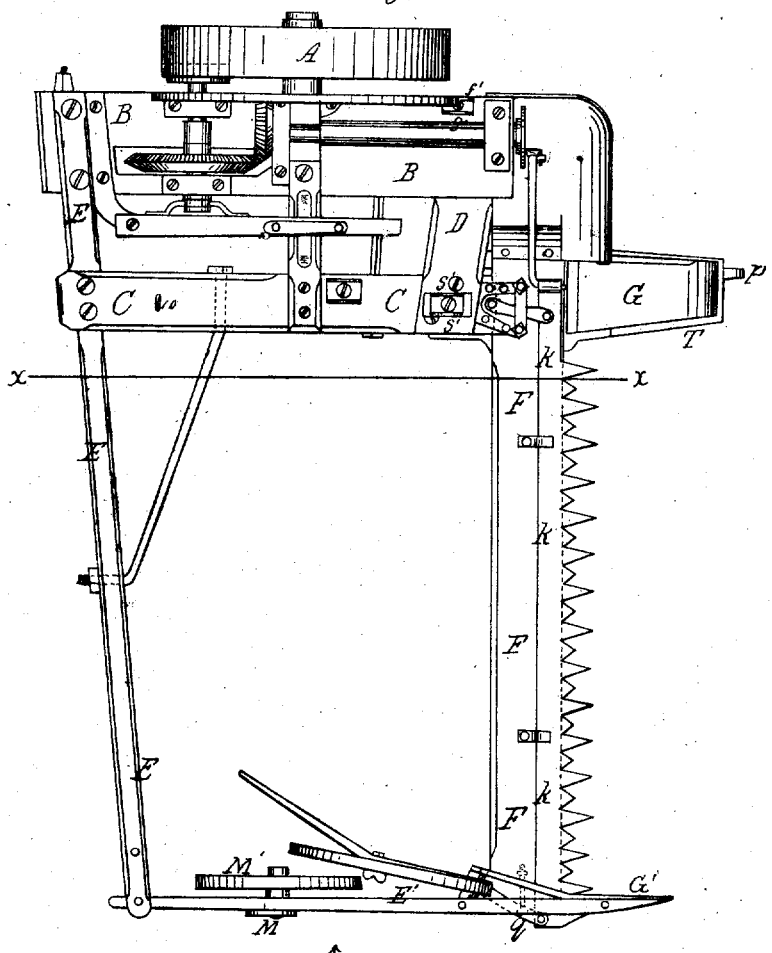
Figure 5:
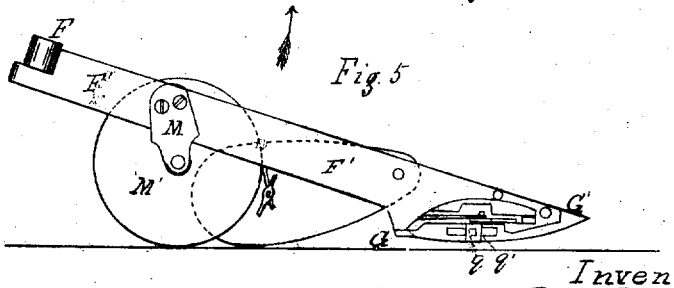

Figure 1 represents a section on line *x x*. Fig. 2 represents a plan or top view of the machine, with the seat, tongue, and levers for raising the cutting apparatus removed in order to show the frame-work more fully. Figs. 3, 4, 5, 6, and 7 represent views of certain parts of the machine detached.

The main frame of the machine is composed of pieces B, C, D, and E, the latter extending out in an elevated position in rear of the finger-beam F, as indicated and shown in Figs. 1 and 2.

That side of the machine which runs next to the standing grass I call the "inside" of the frame, while that next to the cut grass or grain, and by the side of which the main wheel A runs, I call the "outside" of the frame.

The constuction of the main frame is such that the rear of the frame, together with the front outer corner thereof, are elevated above the ground, while the front inner corner is depressed down near the ground. This is effected by fastening piece E to the top of B, while piece D is fastened to the under side of B and to the top of C, the rear of the latter being fastened to the top of E. In this way the front end of C is inclined down, as fully shown in Fig. 1. It will also be observed that the pieces D and E converge toward each other as they extend from piece B, so that after being fastened to piece C a frame of great strength is produced, owing to the bracing position of the parts D and E.

The nature of the invention, which forms the subject of this patent, consists in the combination of certain mechanical devices for facilitating the raising of the cutting apparatus in the McNamara harvester and others constructed on a like plan.

In the drawings these improvements are shown applied to a McNamara harvester, the detailed construction of which is not here deemed necessary, since reference necessary, since reference can be had for that purpose to other patented divisions of even date herewith.

The depressed end of piece C is placed in groove or recess Q, formed in a metallic shoe, G, and the heel of the finger-beam F is placed in a groove or recess, P, formed or cast in the top of the same shoe, so that when said shoe and the parts before named are bolted together a very strong union is formed.

The inner end of the finger beam or bar is fastened to a metallic shoe, G′, which is cast with a horizontal opening to receive a tenon cut on the end of the finger-beam, the parts being held together by bolt *q* and metal washer-piece *q′*, in connection with a nut let into the top of the finger-beam.

The end piece, E′, connects shoe G′ with piece E, so that the frame, finger-beam, and cutter K oscillate when rocked back and forth on wheels A and M′, the former being the drive-wheel.

L is the driver's seat, supported in rear by an elliptical spring, L″, and in front by a bent spring, ‴. The seat is adjustable, so as to be easily moved back and forth on "cross-piece", composed of pieces S S′.

H H′ constitute the tongue or draft-beam, the rear end of which is provided with curved metallic eye-pieces, S S, which are hinged between projections or ears S′ S′, fastened to the upper side of the main frame, the inner ear-piece being raised by a piece, S″, so as to be on a level with the other.

The team is to be attached to a tongue or draft-beam, H H′, in any well-known manner.

The front of the metallic shoe G, to which the heel of the finger beam or bar F is fastened, curves up in front like a runner, as shown at T, and has a projection, *p*, on the front upper side, to which is attached one end of a link-piece, I″, the other end being connected to a horizontal arm, which projects forward at right angles, or nearly so, to another arm, which projects up in a vertical position, both being connected, and constituting a right-angled lever, I, having its fulcrum *g* supported upon the rear inside of the tongue H H′.

The upper end of the vertical arm of lever

I is connected, as indicated in the drawings, to lever K, whose lower end is hinged to the main frame at *t*, while a stop-piece, K′, is hinged to the frame at 10, its front part being curved and provided with a series of holes, as shown in Fig. 1.

The front of the stop-piece K′ passes through a slot in lever K.

When the machine is in operation, the weight of the frame, cutting apparatus, and driver are to be so regulated and adjusted, as that the shoe G and the finger-bar will remain down to the ground so as to cut the stubble short, care being taken to avoid too much weight being thrown upon the shoe, in order to avoid friction on the ground. When the driver wishes to elevate the cutter-bar to avoid an obstruction, he takes hold of lever K and draws it back, thereby causing the vertical arm of lever I to turn back and the horizontal arm of the same lever to turn up, lifting at the same time the shoe which supports the heel of the finger beam or bar, and consequently the cutting apparatus. If the obstruction only requires the raising of the cutting apparatus for a short time, the driver does not let go of lever K until the obstruction is passed, when he allows the lever to swing back until the shoe rests on the ground again; but if it is necessary to keep the cutting apparatus elevated for some little distance, as is the case when passing from one field to another, then the driver, after he has raised the cutting apparatus sufficiently, inserts a pin in front of lever K through one of the holes in stop-piece K′, when the cutting apparatus will remain elevated without further attention from the driver, since stop K′, being hinged to the main frame, cannot yield, but holds lever I back and the cutter-bar up, the strain on stop K′ being borne by the main frame.

It is sometimes convenient for the driver to be able to elevate the cutter without using his hands for that purpose, and which he can do in my machine by pressing his foot on the long arm J of a right-angled lever, whose axis of motion is the same as that of I, whereby the short arm J′ is caused to move back, thus bringing its projection J″ against the end of a curved slot formed in the metal which connects the ends of the arms of lever I, and in which the said projection J″ works. In this way the driver can operate lever I with his feet and cause the cutting apparatus to be raised. He can also, when necessary, operate lever I with his hand while using his feet to assist in the operation, in consequence of the above arrangement of parts.

It is a great advantage to have a hinged tongue, so as to avoid raising or depressing the cutters whenever the front of the tongue is raised or depressed.

As these machines have heretofore been constructed, there has been great objections to the mode of raising the cutting apparatus, in that the operation caused too much exertion on the part of the driver, or else interfered too much with the proper management of the team; but these objections I have endeavored to obviate by the above improvements.

It will thus be seen that the driver, from his seat on the machine, can cause the shoe which supports the heel of the finger-beam and cutting apparatus to be raised so as to press very light on the stubble or ground, or be raised entirely above both, while the weight thus raised will be suspended from the rear of the tongue or draft-beam.

What I claim as my invention under this Patent is—

1. The combination of the following elements in a grain or grass harvester, viz: a main frame, a hinged tongue and two lever arrangements, whereby the driver, from his seat on the machine, can use his feet or his hands, or both, to raise the cutting apparatus and suspend the same from the tongue, for the purpose of passing over cut grass or obstructions in the path of the machine.

2. The combination of lever J J′ with the slotted lever I, substantially as and for the purposes stated.

3. The combination of levers J, J′, and I with the hinged tongue H H′, connection I′, lever K′, and stop-piece K′, substantially as set forth.

4. The combination and arrangment, with the main frame of a grass-harvester and a hinged tongue, to the rear of which is fulcrumed a lever for raising the finger-bar by a backward motion of the driver, of a stop in such a manner as that when the finger-beam is raised above the ground its weight thus raised will be borne by the tongue, while the strain due to holding said lever back will be borne by the main frame to which the stop device is hinged.

5. The combination, with the main frame of a grass-harvester or mowing-machine, of a hinged tongue having a lever fulcrumed to the rear inner side thereof, together with a seat for the driver, the latter being so arranged that the position of the driver will be over the rear of the main frame, and so that he can use his right hand to draw the lever back by a direct backward motion of his arm or body, or both, thus raising the cutting apparatus, while the reins are kept fast and taut in the other hand and the team under full control.

In witness whereof I have hereunto subscribed my name.

DAVID S. McNAMARA.

In presence of—
JOHN M. LANDON,
JOHN H. PECK.